United States Patent
Sedlacek et al.

(10) Patent No.: US 10,763,652 B2
(45) Date of Patent: Sep. 1, 2020

(54) CABLE MANAGEMENT AND PROTECTIVE TRACK

(71) Applicant: Optimal Ventures, LLC, Arlington Heights, IL (US)

(72) Inventors: Walt J. Sedlacek, West Chicago, IL (US); Stephen M. Oshgan, DesPlaines, IL (US)

(73) Assignee: Optimal Ventures, LLC, Arlington Heights, IL (US)

( * ) Notice: Subject to any disclaimer, the term of this patent is extended or adjusted under 35 U.S.C. 154(b) by 0 days.

(21) Appl. No.: 16/684,792

(22) Filed: Nov. 15, 2019

(65) Prior Publication Data

US 2020/0161845 A1    May 21, 2020

Related U.S. Application Data

(60) Provisional application No. 62/767,804, filed on Nov. 15, 2018.

(51) Int. Cl.
*H02G 3/04* (2006.01)

(52) U.S. Cl.
CPC ......... *H02G 3/0437* (2013.01); *H02G 3/0418* (2013.01)

(58) Field of Classification Search
CPC .......................... H02G 3/0437; H02G 3/0418
USPC ........................................................ 174/72 R
See application file for complete search history.

(56) References Cited

U.S. PATENT DOCUMENTS

| 8,342,211 | B2 * | 1/2013 | King | F16L 3/04 |
| | | | | 104/275 |
| 2003/0089515 | A1 * | 5/2003 | Federspiel | H02G 3/0418 |
| | | | | 174/480 |
| 2008/0092470 | A1 * | 4/2008 | Jackson | E04F 19/0436 |
| | | | | 52/288.1 |

* cited by examiner

*Primary Examiner* — Sherman Ng
(74) *Attorney, Agent, or Firm* — Bishop, Diehl & Lee, Ltd.

(57) ABSTRACT

A cable management system having a base section and a cap section with an attachment mechanism to connect the cap to the base. The base of the cable management system includes opposing side projections to form a C-shaped cross-section with an opening between ends of the side projections, while the cap is crescent-shaped and configured to cover the opening when attached to the base. The attachment mechanism is fixed to an interior surface of the base to form two distinct channels. The cap is removable to allow addition, removal and/or adjustment of cords and cables.

10 Claims, 7 Drawing Sheets

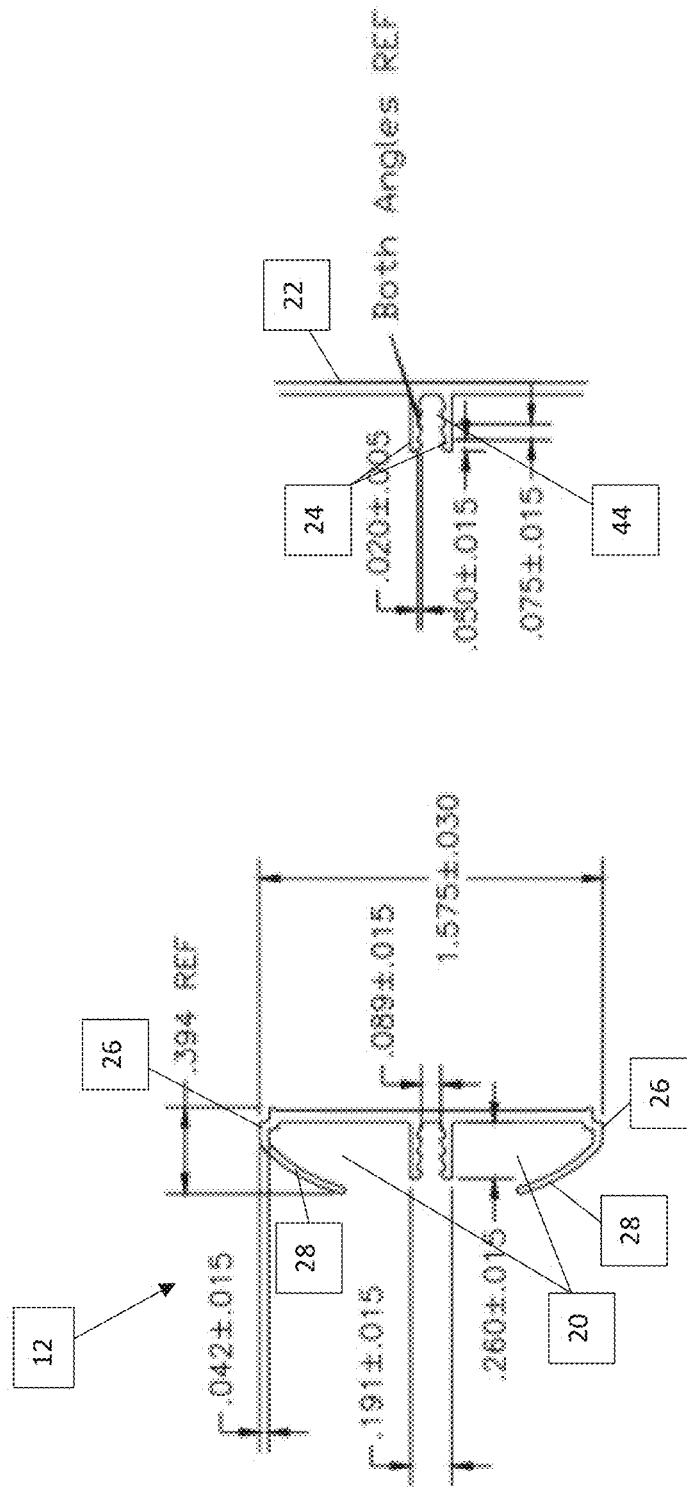

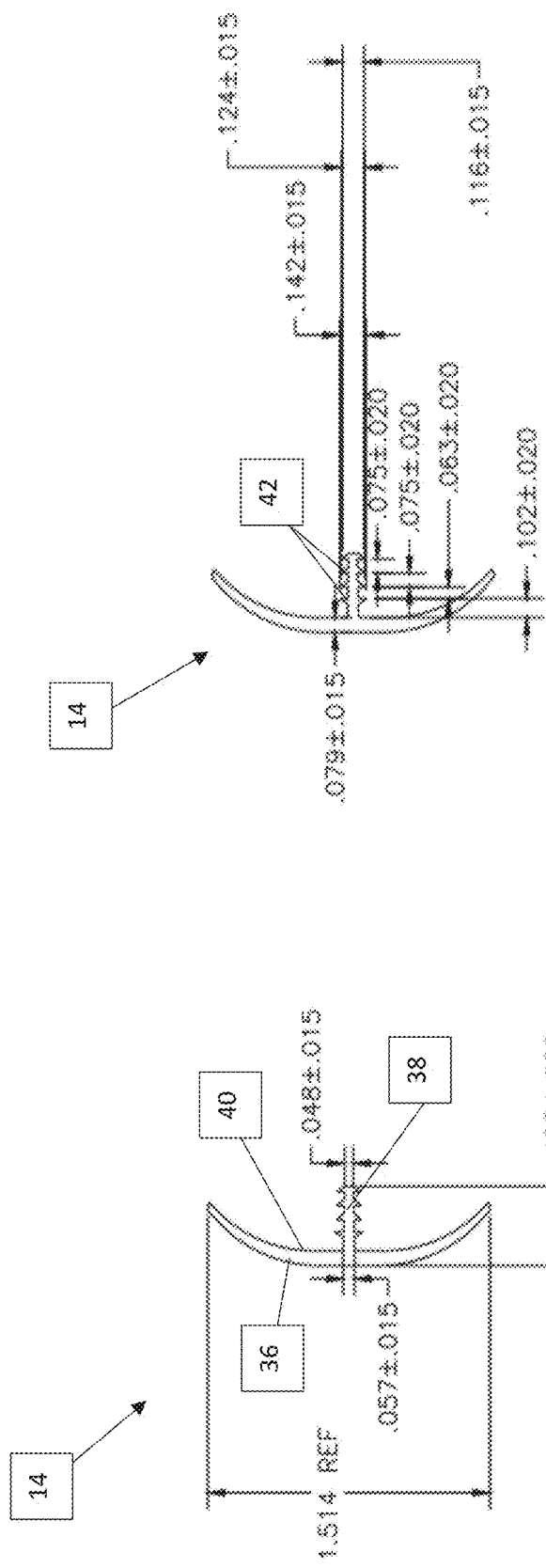

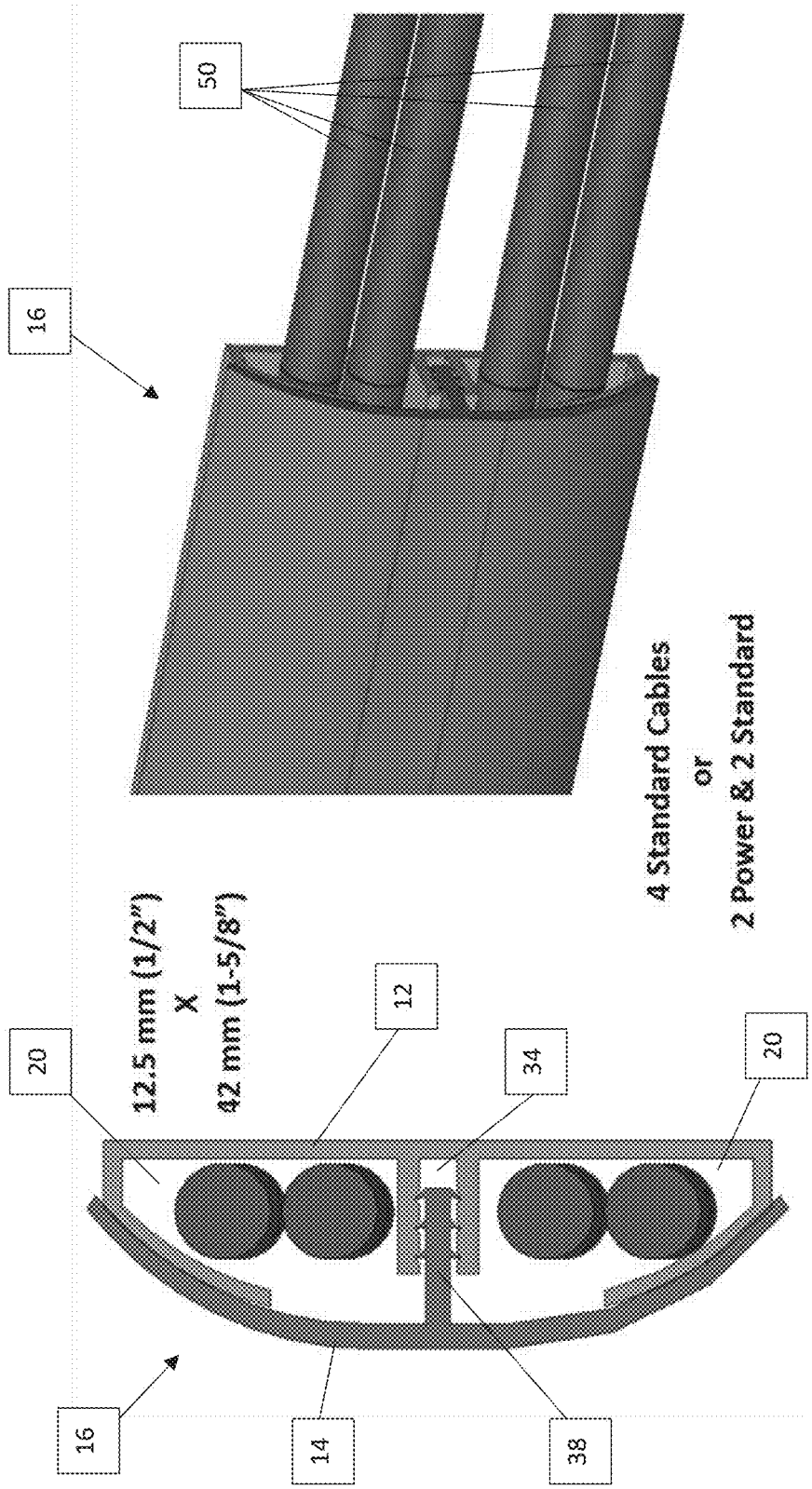

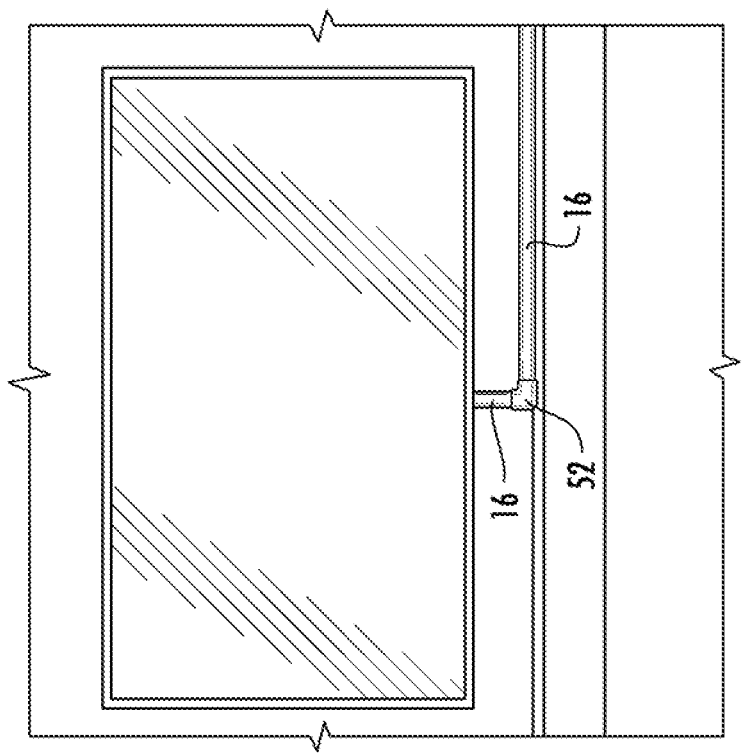
FIG. 6 (AFTER)
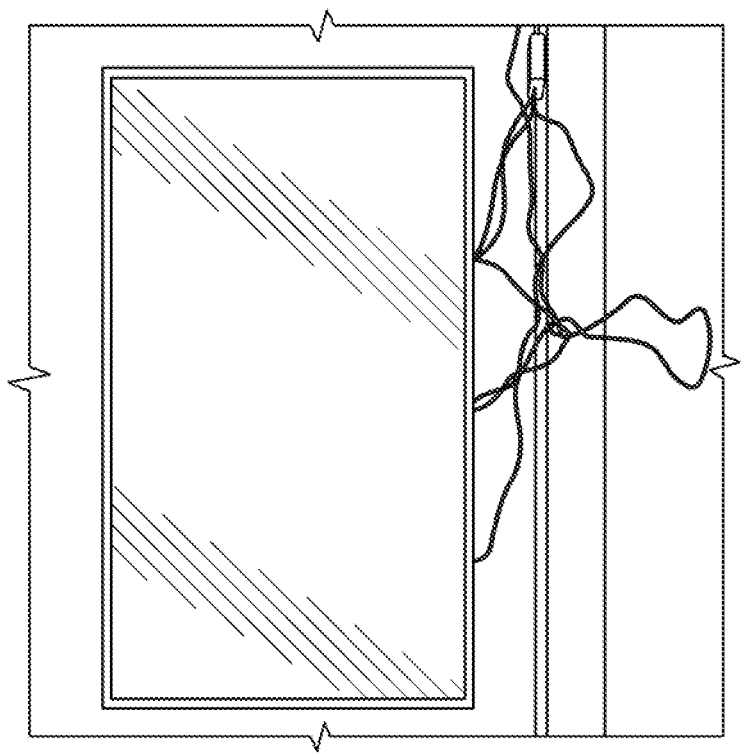
FIG. 5 (BEFORE)

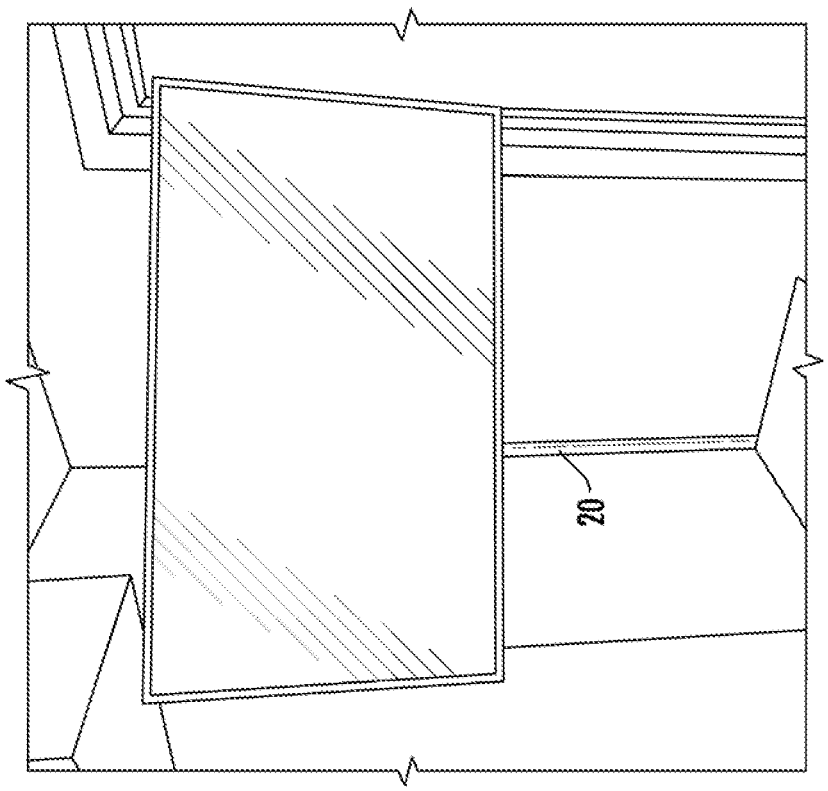
FIG. 8 (AFTER)
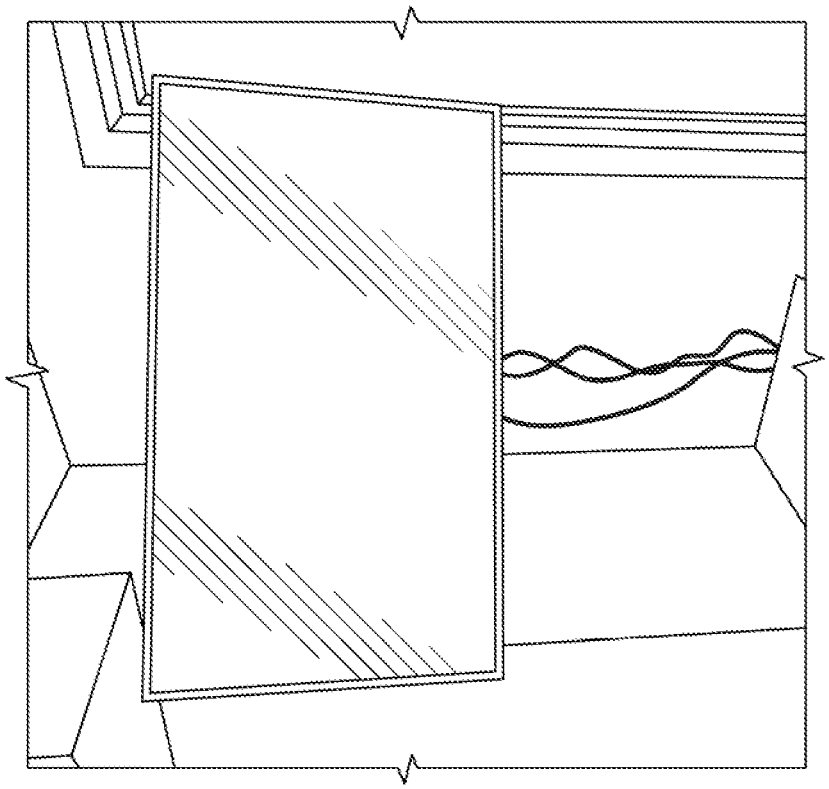
FIG. 7 (BEFORE)

CABLE MANAGEMENT AND PROTECTIVE TRACK

RELATED APPLICATION

The present application claims the filing priority of U.S. Provisional Application No. 62/767,804 titled "Cable Management and Protection Track" and filed on Nov. 15, 2018. The entirety of the '804 application is hereby incorporated by reference.

TECHNICAL FIELD OF THE INVENTION

The present invention relates to cable race-way track used to hide, manage and protect cabling used for electronic equipment, e.g., television, computers, lighting, security cameras, and the like.

BACKGROUND OF THE INVENTION

The use of cable to carry electricity, data, video and audio signals to and from electronic devices used in nearly every home and business on a daily basis, is ubiquitous. And despite the growing use of WiFi and Bluetooth® to fuel wireless technology, the need for power cords, charging cords, connecting cable for video/audio devices, and the like, may never be completely eliminated.

With the use of such cabling comes the unsightliness of the web-like configurations that can detract from a room's aesthetics. Further, the cords can become tripping hazards if run along traveling paths. The cords can be damaged as well, from a constant impact brought about by moving of furniture and daily foot traffic. And, if all that wasn't enough, the cables can become a twisted, intertwined mess over time, making it difficult to determine which cord is attached to which device.

Cable raceway channeling currently exists in many forms. However, until the invention of the present application, prior art systems and devices were unable to solve all of the above problems, as well as other problems associated with cable usage. The present invention provides a protective cover which performs multiple functions without sacrificing design, style or affordability.

SUMMARY OF THE INVENTION

There is disclosed herein an improved cable management system which avoids the disadvantages of prior devices while affording additional structural and operating advantages.

Generally speaking, the system comprises a base section and a cap section with an attachment mechanism to connect the cap to the base.

In a specific embodiment, the base of the cable management system comprises opposing side projections to form a C-shaped cross-section with an opening between ends of the side projections. The attachment mechanism is fixed to an interior surface of the base to form two distinct channels. The cap has a slight crescent-shaped cross-section and covers an opening in the base to conceal cords and cables.

Preferably, the attachment mechanism comprises a female member and a male member wherein the female member and male member are fixed to different of either the base and the cap to facilitate a connection whereby the cap covers the opening of the base. Most preferably, the female member is fixed to the base and the male member is fixed to the cap. Further, the male member comprises a plurality of barb-like structures on an outer surface and the female member comprises a plurality of barb-like structures on an inner surface, wherein the barb-like structures of the male member are configured to couple to the barb-like structures of the female member when the male member is inserted into the female member.

These and other aspects of the invention may be understood more readily from the following description and the appended drawings.

BRIEF DESCRIPTION OF THE DRAWINGS

For the purpose of facilitating an understanding of the subject matter sought to be protected, there are illustrated in the accompanying drawings, embodiments thereof, from an inspection of which, when considered in connection with the following description, the subject matter sought to be protected, its construction and operation and many of its advantages should be readily understood and appreciated.

FIG. 1A is a cross-sectional view of an embodiment of a base section of the disclosed cable management system;

FIG. 1B is a partial cross-section of the base section shown in FIG. 1A;

FIG. 2A is a cross-section of an embodiment of a cap section of the disclosed cable management system;

FIG. 2B is another cross-section of the cap section of FIG. 2B;

FIG. 3A is a cross-section of an embodiment of the disclosed cable management system having four (4) cables mounted therein;

FIG. 3B is a perspective view of a partial section of the embodiment of FIG. 3A;

FIG. 5 is an image of a large flat screen television mounted to a wall showing a tangle of cable "Before" the use of an embodiment of the cable management system of the present disclosure;

FIG. 6 is an image showing "After" the use of an embodiment of the cable management system of the present disclosure for the television of FIG. 5;

FIG. 7 is an image of another large flat screen television mounted within a corner showing the unsightly cords hanging "Before" the use of an embodiment of the cable management system of the present disclosure;

FIG. 8 is an image showing "After" the use of an embodiment of the cable management system of the present disclosure for the television of FIG. 7.

DETAILED DESCRIPTION OF THE INVENTION

Figure 4B:
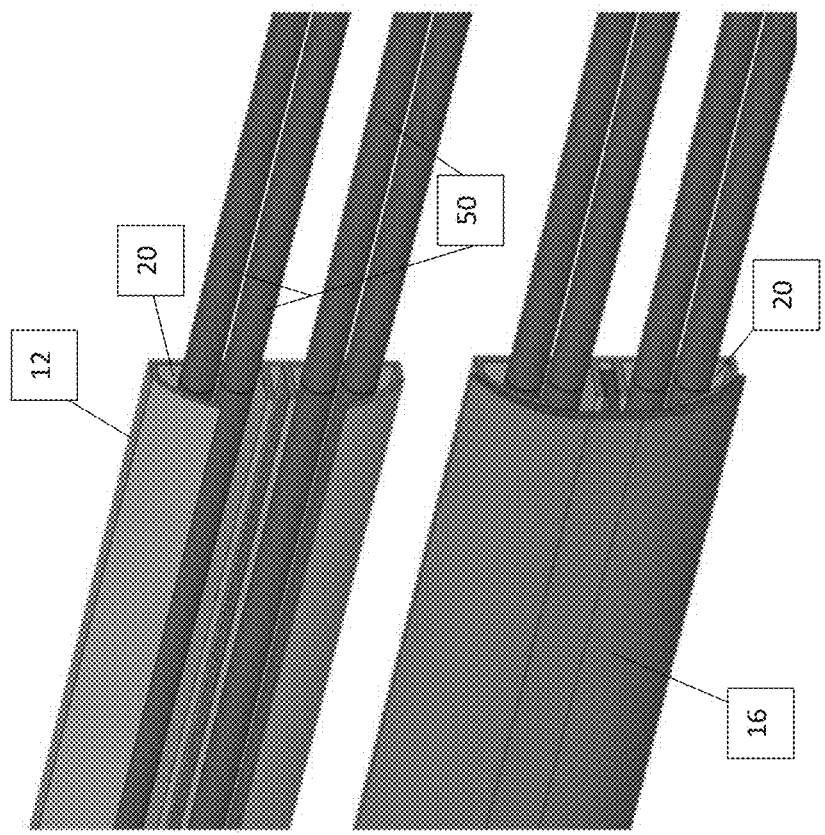
FIG. 4B is a perspective view of the base embodiment of FIG. 4A with four (4) cables therein, and showing without the cap section (top) and with the cap section attached (bottom)

While this invention is susceptible of embodiments in many different forms, there is shown in the drawings and will herein be described in detail at least one preferred embodiment of the invention with the understanding that the present disclosure is to be considered as an exemplification of the principles of the invention and is not intended to limit the broad aspect of the invention to any of the specific embodiments illustrated.

Referring to FIGS. 1-9, there is illustrated a cable management system, generally designated by the numeral 10. The particular illustrated cable management system 10 is for organizing, protecting and hiding cables, cords and wires used for electronic devices.

Generally speaking, with reference to FIGS. 1 and 2, the system 10 is comprised of a base section 12 and a cap section 14 which fit together to form a protective trackway 16. The base section 12 includes two equal longitudinal channels 20. Each of the channels 20 is defined by a planar bottom wall 22, opposing inner and outer sidewalls, 24 and 26, respectively, extending from the bottom wall 22 and a flexible upper projection 28 extending inward from each of the outer sidewalls 26. The flexible upper projections 28 terminate short of the inner sidewalls 24 to form an opening 30 between their respective ends 32. Further, a third longitudinal channel 34 is formed between the two inner sidewalls 24 of the two longitudinal channels 20.

The cap section 14 includes a curved top wall 36 and a transverse connector 38 extending from an inner surface 40 of the top wall 36. The transverse connector 38 of the cap section 14 is configured to be inserted into the third channel 34 of the base section 12 such that the top wall 36 completely expands across the opening 30 between the flexible upper projections 28.

The third longitudinal channel 34 and the transverse connector 38 comprise a mating section of the system 10. While the preferred illustrated embodiment shows the channel 34 as part of the base section 12 and the connector 38 as part of the cap section 14, these two components may be switched in alternate embodiments.

Preferably, the two longitudinal channels 20 are substantially equal in size, as illustrated, but it is possible to have one channel larger than the other for specific uses. Also, the transverse connector 38 preferably includes a barb 42, most preferably several barbs 42, which engage corresponding barbs 44 within the walls of the third channel 34. Other configurations to detachably secure the two sections, 12 and 14, together may be used.

Figure 4A:
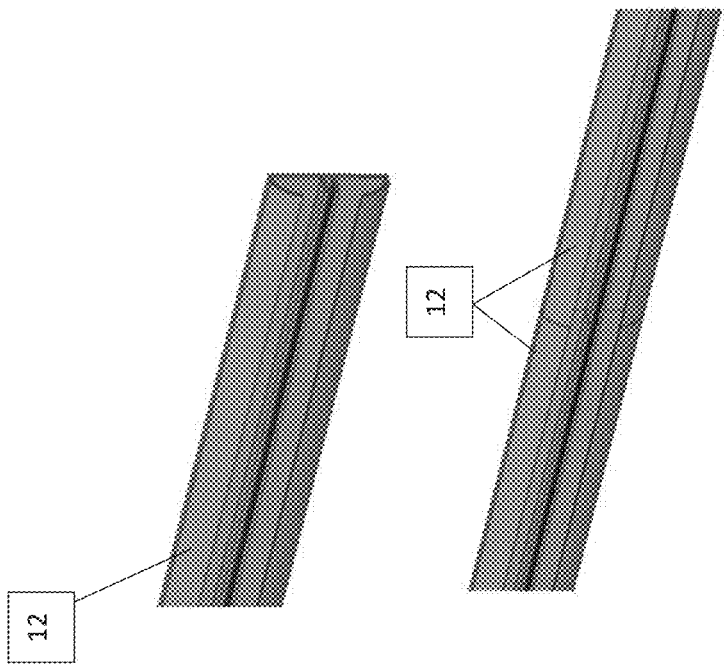
FIG. 4A is a perspective view showing an embodiment of a single base section (top) and two abutted base sections (bottom)

As illustrated in FIGS. 3 and 4, cables 50 may be positioned within the base section 12 and secured by the placement of the cap section 14 over the opening 30, using the connector 38 inserted within the third channel 34. A strip of foam adhesive 46 can be adhered to a flat outer surface of the bottom wall 22 of the base section 12 to allow the base section 12 to be secured to a surface, such as a floor or wall. Use of the adhesive 46 makes the cable management system 10 simple to install—just peel an adhesive paper off and press the base section 12 to a desired wall, baseboard or other surface.

In a specific embodiment of the system 10, the two sections, 12 and 14, are comprised of an impact-resistant, flexible polymer material which can be painted to fit any décor. The sections 12 and 14 are preferably manufactured in long continuous lengths which can be readily cut to any smaller lengths. These features make the system 10 easy to install without any need to cut holes in walls or other surfaces for mounting. Ultimately, the system 10 provides clean, professional looking cable management.

Examples of the system 10 in use are shown in FIGS. 5 and 6 and FIGS. 7 and 8. The system 10 can be designed for covering home entertainment wires, TV & video cabling, home office cables, entertainment systems, speaker wires or any other low-voltage cabling projects with great results.

The system 10 provides a slim and sleek design which can be blended into any décor by painting the exterior any desired color. The continuous straight channel of the base section 12, preferably lengths of 10 foot (3.3 meters), allows installation in one continuous strip, as opposed to piecing several small sections along a wall. The preferred material is simple to cut into a desired length using a utility knife or the like.

Figure 9:
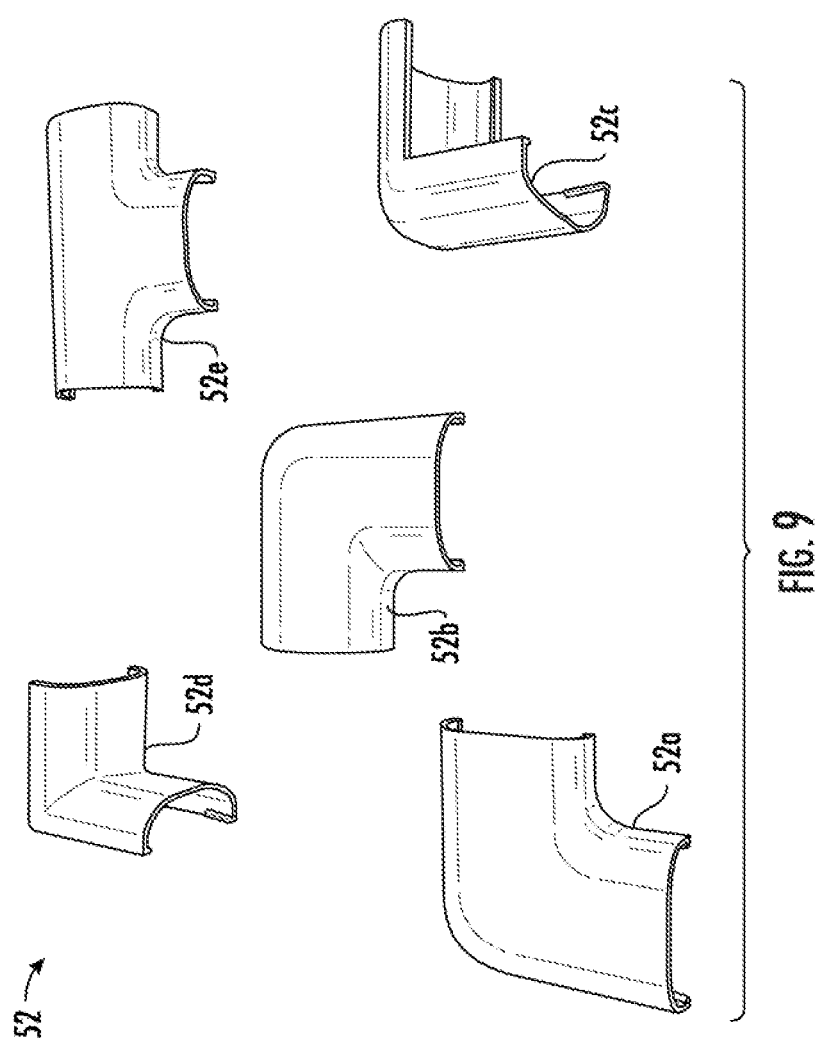
FIG. 9 is an image showing embodiments of different couplers for connecting trackway sections to one another.

As an added feature, kits of system 10 having specific lengths of the sections, 12 and 14, can be offered with at least one and preferably several couplers 52 to connect assembled sections of trackway. The coupler 52 can be attached to a trackway end to create longer tracks as well as avoid obstacles. As shown in FIG. 9, couplers can be a 90° right turn 52a, a 90° left turn 52b, a 90° down turn (outside corner) 52c, or a 90° up turn (inside corner) 52d. The coupler 52 may also be just a straight section (not shown) to connect two shorter trackway sections 16 into a longer trackway section. The coupler 52 may also be a "T" or "Y" shape 52e to split one line or join two lines. Of course, other angles and variations are possible. These couplers 52 allow for a customized cable management system.

After construction of a cable management trackway, the cap section 14 can be removed to allow easy access to cords 50—if cords need to be added or adjusted after installation, simply pull outward to remove the connector 38 of the cap section 14 from the third channel 34 of the base section 12 and press back in place when finished.

The width of base section 12 provides greater cord capacity. As shown, the system 10 can accommodate several HDMI cables, standard cable, speaker wires, power cords or any combination thereof. The two internal channels 20 allow a user to gently tuck cords 50 instead of cramming them all into a single channel and trying to close a cover. This avoids pinching cords or leaving cords exposed to possible damage.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A cable management system comprising: a base section having two longitudinal channels, each defined by a planar bottom wall, opposing inner and outer sidewalls extending from the bottom wall and a flexible upper projection extending inward from each of the outer sidewalls terminating to form an opening between the flexible upper projections; a cap section having a curved top wall; and a mating section for connecting the cap section to the base section, wherein the mating section comprises a third longitudinal channel and a longitudinal connector configured to be inserted into the third channel such that the curved top wall of the cap section completely expands across the opening between the flexible upper projections of the base section to form a track section, wherein the third longitudinal channel is formed between the two inner sidewalls of the two longitudinal channels of the base section and the longitudinal connector extends transversely from a lower surface of the cap section and the longitudinal connector comprises a plurality of barb-like structures on the outer surface and the third channel comprises a plurality of corresponding barb-like structures on the inner surface to engage the plurality of barb-like structures in the third channel when inserted therein.

2. The system of claim 1, wherein the longitudinal connector is configured to be removable from the third channel after insertion.

3. The system of claim 1, wherein the cap section is attachable to and detachable from the base section.

4. The system of claim 1, wherein the two longitudinal channels have equal widths.

5. The system of claim 1, wherein the two longitudinal channels have different widths.

6. The system of claim 1, further comprising an adhesive applied to an outer surface of the base section.

7. The system of claim 1, wherein the cap section and base section are comprised of a paintable material.

8. The system of claim 1, further comprising at least one coupler to connect at least two track sections together.

9. The system of claim 7, wherein the at least one coupler has a 90-degree turn.

10. The system of claim 7, wherein the at least one coupler has a shape selected from one of an L-shape, a T-shape or straight.

* * * * *